United States Patent [19]

Kadomatsu, deceased

[11] Patent Number: 4,630,123
[45] Date of Patent: Dec. 16, 1986

[54] COMPACT FACSIMILE MACHINE

[75] Inventor: Shigeru Kadomatsu, deceased, late of Yokohama, Japan, by Tamie Kadomatsu, Nozomi Kadomatsu, heirs

[73] Assignee: Ricoh Company, Ltd., Japan

[21] Appl. No.: 579,216

[22] Filed: Feb. 10, 1984

[30] Foreign Application Priority Data

Feb. 10, 1983 [JP] Japan .................. 58-19693
Feb. 10, 1983 [JP] Japan .................. 58-19694

[51] Int. Cl.⁴ .................. H04N 1/00; H04N 1/04; H04N 1/10
[52] U.S. Cl. .................. 358/256; 358/285; 358/286; 358/293
[58] Field of Search .............. 358/256, 285, 286, 293, 358/294, 304; 29/DIG. 29; 312/257 SM, 102, 352; 211/44; 242/55.2; 355/72

[56] References Cited

U.S. PATENT DOCUMENTS

| | | | |
|---|---|---|---|
| 3,469,027 | 9/1969 | Reese et al. | 358/286 |
| 3,527,882 | 9/1970 | Brouwer et al. | 358/293 |
| 3,818,126 | 6/1974 | Fomenko et al. | 358/286 |
| 3,845,239 | 10/1974 | Grauzon et al. | 358/286 |
| 4,197,789 | 4/1980 | Yvard | 358/294 |
| 4,266,251 | 5/1981 | Hara et al. | 358/294 |
| 4,442,459 | 4/1984 | Fukui et al. | 358/293 |
| 4,452,141 | 6/1984 | Mistyurik | 29/DIG. 29 |
| 4,492,970 | 1/1985 | Lee et al. | 358/293 |

Primary Examiner—John W. Shepperd
Assistant Examiner—John K. Peng
Attorney, Agent, or Firm—Guy W. Shoup

[57] ABSTRACT

A compact facsimile machine comprises a housing having a particular shape. The housing includes a pair of upright side walls and semi-circular and flat walls which are connected as arranged side by side and which extends horizontally between the pair of side walls, and, preferably, it is integrally formed from a reinforced plastic material. With this housing, a roll of recording paper may be stored in the semi-circular wall and a recording device such as a thermal print head may be disposed above the flat wall with an image sensor mounted on the flat wall. More importantly, an optical path from a scanning section for scanning an original document to the image sensor may be defined as folded around the convex surface of the semi-circular wall using a plurality of reflecting mirrors, thereby allowing to make the overall structure small without causing any deterioration in facsimile performance.

19 Claims, 10 Drawing Figures

COMPACT FACSIMILE MACHINE

BACKGROUND OF THE INVENTION

1. Field of the Invention

This invention generally relates to a facsimile machine and particularly to a compact facsimile machine such as the desk-top type.

2. Description of the Prior Art

Due to recent developments in communication technology, facsimile machines are getting more and more important and more and more used in offices and factories. A facsimile machine is provided with various components many of which have been made smaller in size individually mainly by the application of IC chips. Be that as it may, prior art facsimile machines have been relatively large in size partly due to the arrangement of components required for operation. Examples of the internal structure of prior art facsimile machine are shown in FIGS. 1a through 1c. As shown, a facsimile machine generally comprises a roll 1 of recording paper, which is rotatably supported, a thermal print head 2 for printing information on the recording paper unrolled from the roll 1, a platen roller 3 for keeping the unrolled recording paper in pressure contact with the thermal print head 2, a paper cutter 4 for cutting the recording paper to a desired size, an original document 5 to be scanned, a document feed roller 6 for feeding the original document 5, a scanning region 7 where the original document 5 is scanned and the information read, an image sensor 8 such as a CCD and an optical path 9 along which various optical components such as lenses and mirrors are disposed.

As exemplified by these illustrated structures, the prior art facsimile machines necessarily tend to be bulky and occupy relatively large installation space. In addition, the interior of a facsimile machine is generally divided into three sections: reading section for reading an original document including such elements as an original document feeding mechanism, an optical path and an image sensor, a recording section for recording received facsimile information including such elements as a roll of recording paper, a thermal print head and a paper cutter, and a voltage supply section. The prior art main approach of arranging components in a facsimile machine has been to divide the interior space into these three separate sections and to locate components in the separate sections appropriately. For example, in the structure of FIG. 1a, the reading section including such elements as 5-9 is defined generally at the bottom of the right half and the recording section including such elements as 1-4 is defined generally in the left half. On the other hand, in FIG. 1b, the reading section is defined in the bottom half and the recording section is defined in the top half; whereas, the reversed structure is shown in FIG. 1c.

SUMMARY OF THE INVENTION

It is therefore a primary object of the present invention to provide a compact facsimile machine.

Another object of the present invention is to provide a desk-top type facsimile machine which is small in size and requires only a small installation area.

A further object of the present invention is to provide a small-sized facsimile machine whose dead space in its interior is minimized.

A still further object of the present invention is to provide an improved facsimile machine which is easy to manufacture, low in cost and yet sturdy in structure.

Other objects, advantages and novel features of the present invention will become apparent from the following detailed description of the invention when considered in conjunction with the accompanying drawings.

DESCRIPTION OF THE PREFERRED EMBODIMENT

Figure 1A:
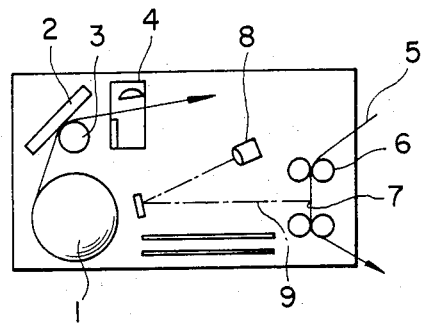
FIGS. 1a through 1c are schematic illustrations showing a few examples of the internal structure of the prior art facsimile machine.
Figure 1B:
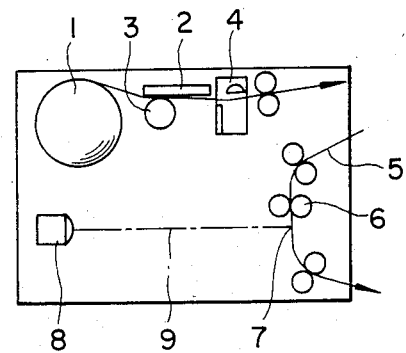
Figure 1C:
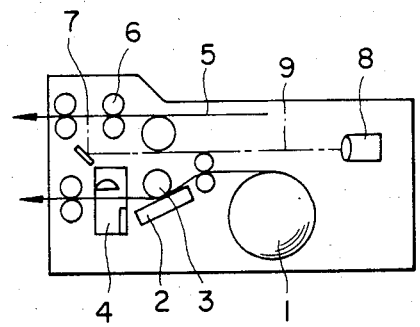
Figure 2:
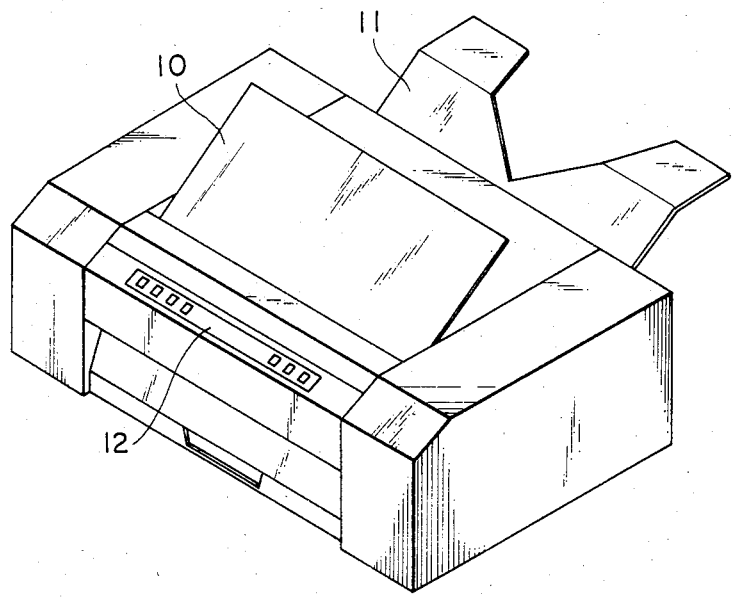
FIG. 2 is a perspective view showing an overall outlook of a compact facsimile machine constructed in accordance with one embodiment of the present invention.
Figure 3:
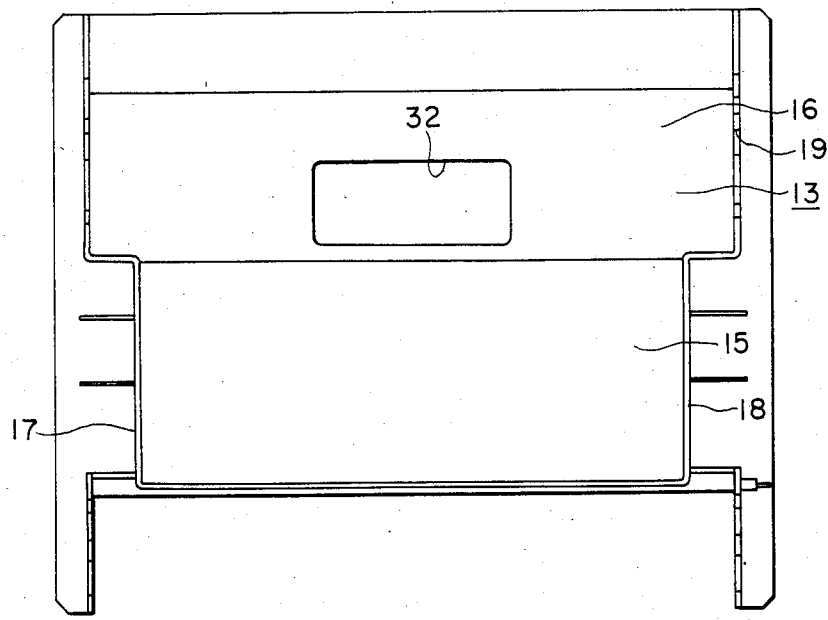
FIG. 3 is a plan view showing a housing used in the facsimile machine of FIG. 2.
Figure 4:
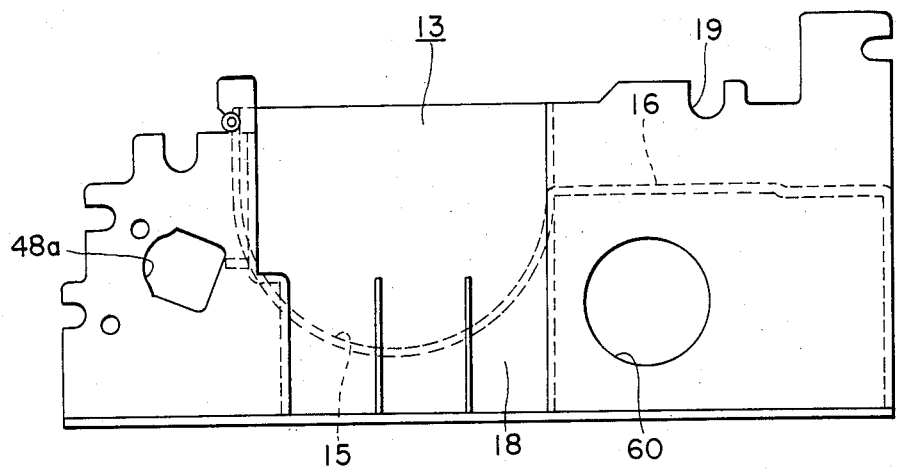
FIG. 4 is a side elevational view of the housing shown in FIG. 3.
Figure 5:
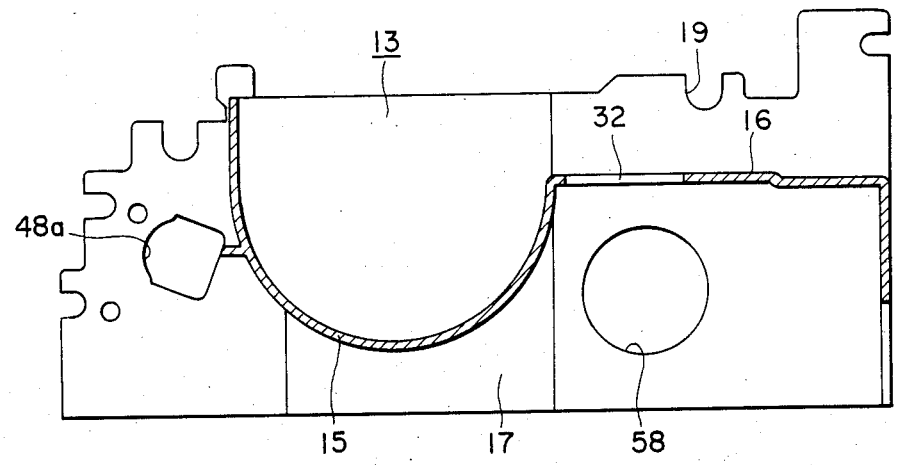
FIG. 5 is a longitudinal cross-sectional view of the housing shown in FIG. 3.
Figure 8:
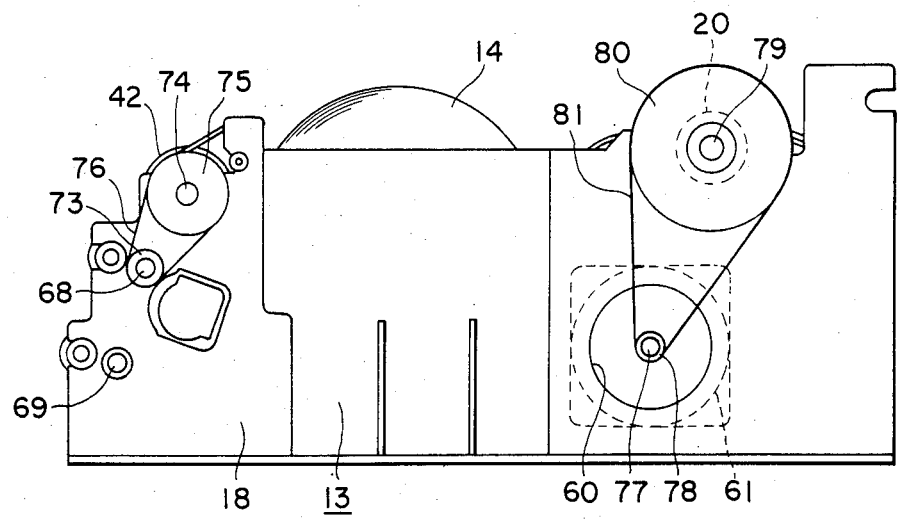
FIG. 8 is a right-hand side elevational view of the facsimile machine shown in FIG. 2 with its cover removed.

Referring now to FIG. 2, there is shown in perspective a compact-sized facsimile machine constructed in accordance with one embodiment of the present invention and it comprises an original document table 10 on which an original document (not shown) to be read or scanned may be placed, a tray 11 on which recording paper with recorded information may be placed when discharged out of the facsimile machine and an operating panel 12 provided with several buttons which may be selectively depressed by an operator to give instructions to the facsimile machine. FIGS. 3 through 5 illustrate the shape of a housing 13 used in the facsimile machine of FIG. 2. As shown, the housing 13 generally comprises a left-hand side wall 17, a right-hand side wall 18, a semi-circular horizontal wall 15 extending between the side walls 17 and 18 with its concave surface directed upward and a flat horizontal wall 16 extending from one side of the semi-circular horizontal wall 15 and between the side walls 17 and 18. The housing 13 is preferably fabricated as a unit from plastics such as reinforced plastics and it is provided with holes appropriately for use in mounting various components in position, as shown in FIGS. 6 or 8.

Figure 6:
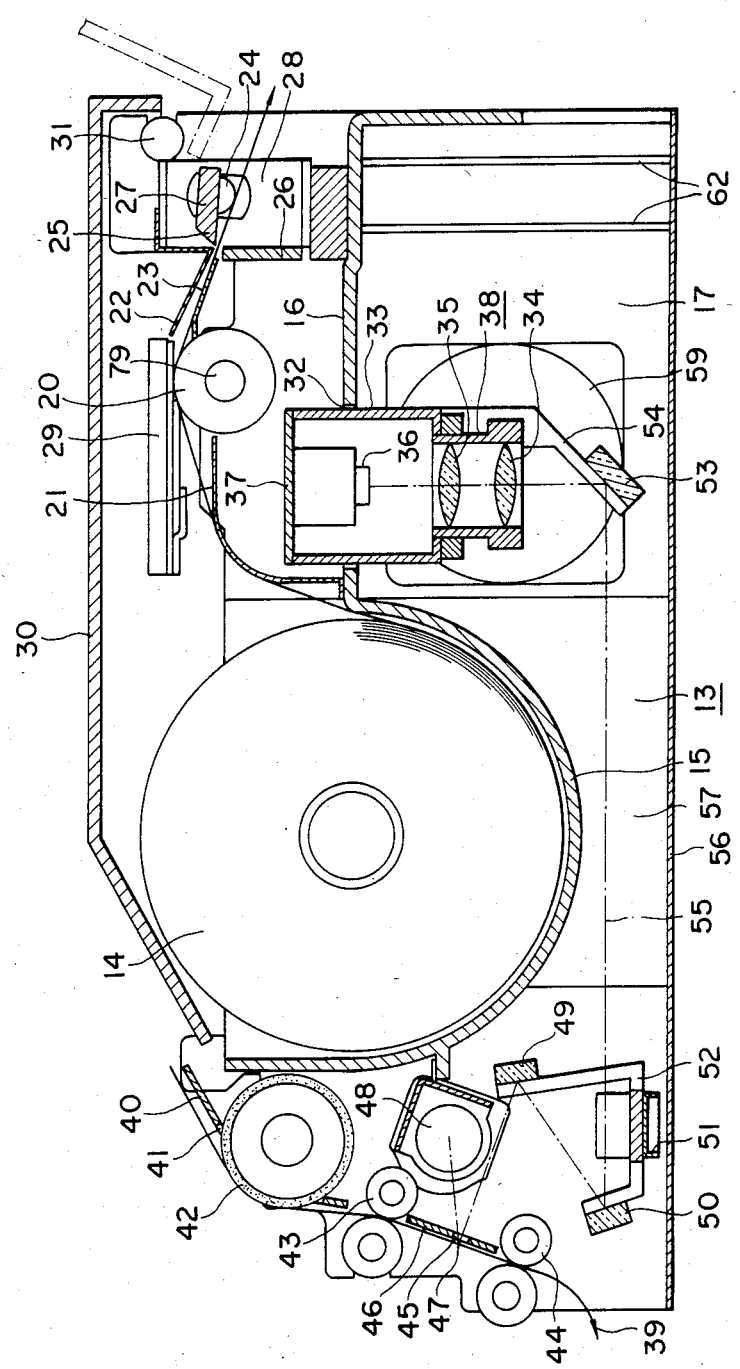
FIG. 6 is a longitudinal cross-sectional view of the facsimile machine shown in FIG. 2.

Referring to FIG. 6, above the flat horizontal wall 16 is mounted part of its recording mechanism for recording received facsimile information on a sheet of recording paper unrolled from a roll 14 which is partly received in the semi-circular horizontal wall 16 as will be described more in detail later. That is, each of the left-hand and right-hand side walls 17 is provided with a notch 19 at its top, as best shown in FIGS. 4 and 5, and a platen roller 20 is provided with its both ends rotatably supported in the notches 19, 19. Also provided as fixedly attached to the housing 13 is a generally L- shaped guide plate 21 which extends from the connection between the semi-circular horizontal wall 15 and the flat horizontal wall 16 toward the platen roller 20 in the form of an arc thereby defining a passage along which the recording paper unrolled from the roll 14 advances. In the downstream of the platen roller 20 with respect to the direction of advancement of the recording paper and thus at the side opposite to the side of L-shaped guide plate 21 is disposed a pair of paper discharging guide plates 22 and 23 as arranged vertically spaced apart from each other and fixedly attached to the housing 13.

Adjacent to the exit defined by the pair of paper discharging guide plates 22 and 23 is disposed a cutter mechanism 27 as mounted on a support plate 28. The cutter mechanism 27 includes a shaft 24 which is driven to rotate by means of a driving source (not shown and on which is fixedly mounted a movable blade 25 and a stationary blade 26 which cooperates with the movable blade 25 for cutting the recording paper to a desired size. Also provided is a thermal print head 29 which is mounted on a cover 30 and which is in pressure contact with the platen roller 20 when set in position. The cover 30 is pivotally connected to the housing 13 through a pivot 31 so that the top of facsimile machine may be opened or closed by pivotting the cover 30 around the pivot 31.

The flat horizontal wall 16 is provided with a rectangular hole 32 through which extends a lens holder 33 as fitted therein. The lens holder 33 holds lenses 34 and 35 at its bottom and a CCD 36 together with its printed circuit board 37 thereby as a whole defining a lens block 38, which, in turn, constitutes part of the reading mechanism. To the left of the semi-circular horizontal wall 15 and thus adjacent to the side of the semi-circular horizontal wall 15 opposite to the side of the flat horizontal wall 16 is provided an original document feeding mechanism for transporting an original document 39 along a predetermined path for scanning. The original document feeding mechanism includes an inlet guide plate 40 fixedly attached to the housing 13 and disposed aslant thereby defining an extension of the table 10. The inlet guide plate 40 is provided with a slot 41 through which a rotatably supported rubber roller 42 partly projects. Also provided in the downstream of the rubber roller 42 are transport rollers 43 and 44 for transporting the original document 39 along a predetermined path.

Disposed between the transport rollers 43 and 44 is an intermediate guide plate 46 which is provided with a slit 45 which extends in the direction vertical to the advancing direction of the original document 39. And, thus, the original document is slit-scanned while it is being transported along the intermediate guide plate 46 so that a region indicated by reference numeral 47 defines an original reading or scanning region. A lamp 48 is mounted on the housing 13 so as to illuminate the scanning region 47. A profiled hole 48a provided in the housing 13 as best shown in FIGS. 4 and 5 is used for mounting the lamp 48 in position.

As also shown in FIG. 6, a first reflecting mirror 49 is disposed close to the convex side of the semi-circular horizontal wall 15 so as to receive the light reflected from the scanning region 47 as indicated by the one-dotted line. Below the transport roller 44 and thus at a position closer to the front side or left side in FIG. 6 of the facsimile machine is disposed a second reflecting mirror 50 for receiving the light reflected by the first mirror 49. These mirrors 49 and 50 are securely attached to a mirror holder 52 which is mounted on a supporting member 51, which, in turn, is fixedly attached to the housing 13. The second mirror 50 is so disposed to reflect the light from the mirror 49 to the rear side or right side in FIG. 6 horizontally as passing below the semi-circular horizontal wall 15 as indicated by the one-dotted line in FIG. 6.

Below the lens block 38 is disposed a third reflecting mirror 53 which is fixedly mounted on a supporting member 54 which is integral with the lens holder 33. As indicated by the one-dotted line, the light impinging on the mirror 53 as reflected by the mirror 50 is directed into the lens block 38. Of importance, the optical path starting from the scanning region 47 and ending with the CCD 36 is defined as suitably folded around the convex side of the semi-circular horizontal wall 15. This is important in making the machine as a whole smaller in size without causing deterioration in performance. The present structure allows to secure a required length for the optical path between the scanning region 47 and the CCD 36 while maintaining the overall size to be remarkably small. Also provided is a bottom plate 56 as attached to the bottom of the housing 13 thereby defining an enclosed or light-shielded light path space 57 below the rounded horinzontal wall 15.

As shown in FIG. 5, the left-hand side wall 17 is provided with a circular hole 58 which is used for mounting a motor 59; on the other hand, as shown in FIG. 4, the right-hand side wall 18 is proivded with another circular hole 60 which is used for mounting another motor 61. As shown in FIG. 6, a pair of printed circuit boards 62, 62 are provided between the side walls 17 and 18.

Figure 7:
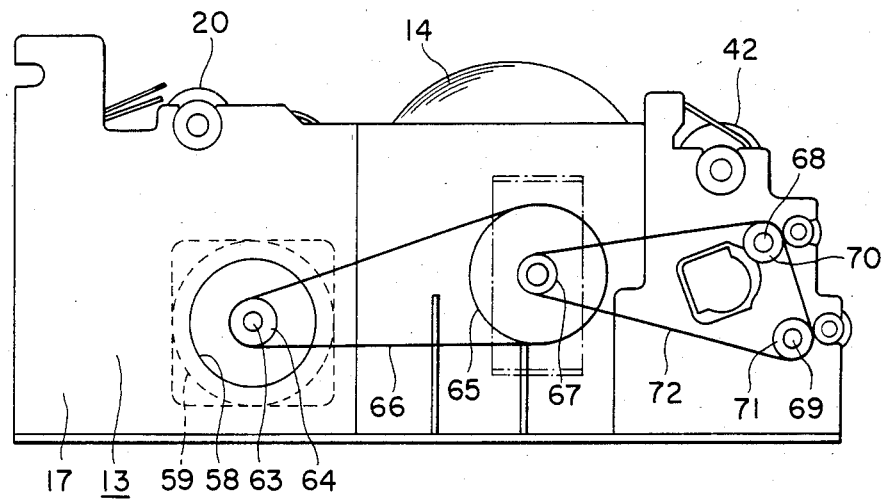
FIG. 7 is a left-hand side elevational view of the facsimile machine shown in FIG. 2 with its cover removed.

As shown in FIGS. 7 and 8, a power transmitting system is provided at the outer side of each of the side walls 17 and 18. As shown in FIG. 7, at the exterior side of side wall 17 is provided a pulley 64 mounted on a shaft 63 of the motor 59 and a larger-sized idler pulley 65, and an endless belt 66 is extended between the pulleys 64 and 65. A smaller-sized idler pulley 67 is provided coaxially and integrally with the larger-sized idler pulley 65 and pulleys 70 and 71 are provided as mounted on shafts 68 and 69 of transport rollers 43 and 44, respectively. And, another endless belt 72 is extended around the pulleys 67, 70 and 71. On the other hand, as shown in FIG. 8, at the exterior side of side wall 18 is provided a pulley 73 mounted on the shaft 68 and a pulley 75 mounted on a shaft 74 of transport roller 42 with an endless belt 76 extended between these pulleys 73 and 75, so that the transport roller 42 is also driven to rotate by the motor 59. In addition, a pulley 78 is mounted on a shaft 77 of motor 61, which is in driving connection with a pulley 80 mounted on a shaft 79 of platen roller 20 through an endless belt 81.

As described in detail above, in accordance with the present invention, since the pair of side walls 17 and 18 standing upright in parallel and spaced apart from each other over a predetermined distance, the rounded horizontal wall 15 which extends horizontally between the pair of upright side walls 17 and 18 and which stores therein at least partly the roll 14 of recording paper, the flat horizontal wall 16 connected to the rounded horizontal wall 15 and extending horizontally between the pair of upright side walls 17 and 18 are integrally formed to define the housing 13, the overall structure of facsimile machine may be made significantly smaller with minimizing the unused space inside the machine. Moreover, since the optical path from the scanning region 47 to the CCD 36 as an image sensor is provided as folded around the rounded roll holder 15, the overall structure may be made smaller without causing deterioration in facsimile performance.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A housing of an integral structure for use in a facsimile machine, comprising:
   a pair of side walls held upright in parallel and spaced apart from each other over a predetermined distance;
   a rounded horizontal wall extending horizontally between said pair of side walls with its concave surface directed upward; and
   a flat horizontal wall arranged side by side with said rounded horizontal wall, extending horizontally between said pair of side walls and from one side of said rounded horizontal wall substantially to one end of said pair of side walls.

2. The housing of claim 1 wherein said rounded horizontal wall is semi-circular in cross section.

3. The housing of claim 2 wherein said flat horizontal wall is provided approximately at a mid-height of said pair of side walls and the sides of said semi-circular horizontal wall are generally in plane with the surface of said flat horizontal wall.

4. The housing of claim 3 wherein bottom of said semi-circular wall is located at a predetermined distance above the bottom of said pair of side walls.

5. The housing of claim 1 wherein said pair of side walls and said rounded and flat horizontal walls are integrally formed.

6. The housing of claim 5 wherein said housing is formed from a reinforced plastic material as a unit.

7. A facsimile machine comprising:
   a housing of an integral structure including a pair of side walls held upright in parallel as spaced apart from each other, a rounded horizontal wall extending horizontally between said pair of side walls with its concave surface directed upward and a flat horizontal wall extending horizontally between said pair of side walls and from one side of said rounded horizontal wall substantially to one end of said pair of side walls;
   a roll of recording paper stored in said rounded horizontal wall;
   recording means disposed above said flat horizontal wall for recording received facsimile information on a sheet of recording paper unrolled from said roll of recording paper;
   image sensing means mounted on said flat horizontal wall for converting light image information into electrical image information;
   feeding means disposed adjacent to the side of said rounded horizontal wall opposite to said one side joining said flat horizontal wall for feeding an original document along a predetermined path in which a scanning region for scanning said original document is provided; and
   an optical system for leading scanning light at said scanning region to said image sensing means.

8. The facsimile machine of claim 7 wherein said rounded horizontal wall is semi-circular in cross section.

9. The facsimile machine of claim 8 wherein said recording means includes a thermal print head.

10. The facsimile machine of claim 8 wherein image sensing means includes a CCD ( Charge Coupled Device ).

11. The facsimile machine of claim 8 wherein said predetermined path is defined almost vertically at the front end of said machine.

12. The facsimile machine of claim 8 wherein said optical system includes a plurality of reflecting mirrors which are disposed such that the optical path from said scanning region to said image sensing means is defined folded around the convex surface of said semi-circular horizontal wall.

13. The facsimile machine of claim 8 further comprising a driving system as mounted at the outer side of each of said side walls.

14. A facsimile machine comprising:
   a housing of an integral structure including at least a pair of side walls held upright in parallel as spaced apart from each other and a rounded horizontal wall extending horizontally between said pair of side walls with its concave surface directed upward;
   image sensing means mounted on said housing at a first position below said rounded horizontal wall for receiving light image information and converting it into electrical image information;
   feeding means mounted on said housing for feeding an original document along a predetermined path;
   scanning means mounted on said housing at a second position below said rounded horizontal wall, which is opposite to said first position with respect to said rounded horizontal wall, for scanning said original document fed along said predetermined path by said feeding means to produce said light image information; and
   an optical system for leading said light image information produced by said scanning means to said image sensing means along a folding light path defined around a convex side of said rounded horizontal wall.

15. A facsimile machine according to claim 14 wherein said rounded horizontal wall is semi-circular in cross section.

16. A facsimile machine according to claim 15 further comprising a roll of recording paper partly stored in said rounded horizontal wall and recording means mounted on said housing for recording received facsimile information on a sheet of recording paper unrolled from said roll of recording paper.

17. A facsimile machine according to claim 16 wherein said optical system includes a plurality of reflecting mirrors which are disposed to define said folding light path around the convex side of said rounded horizonzal wall.

18. A facsimile machine according to claim 17 wherein said recording means includes a thermal print head.

19. A facsimile machine according to claim 18 wherein said image sensing means includes a CCD.

* * * * *